J. T. STEPHENS, Sr.
AUTOMATIC CUTTING AND TYING DEVICE FOR BALING PRESSES.
APPLICATION FILED FEB. 24, 1912.
1,046,891.
Patented Dec. 10, 1912.
2 SHEETS—SHEET 1.
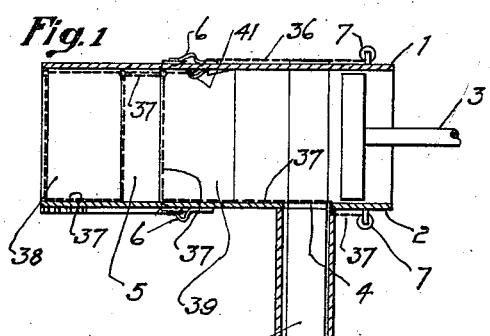
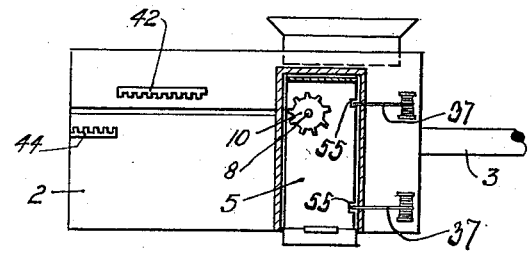
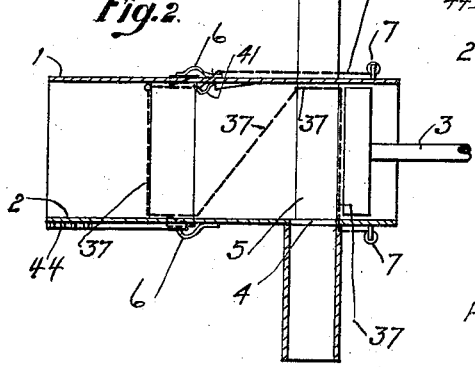
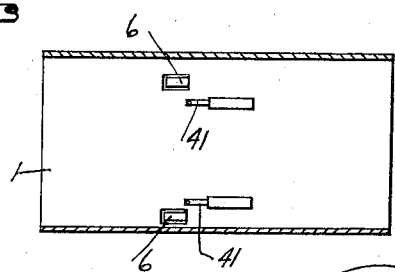
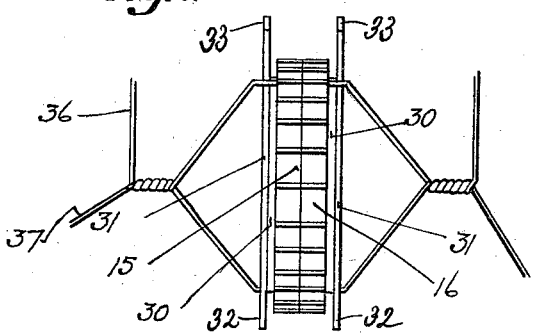
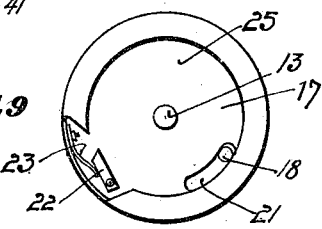
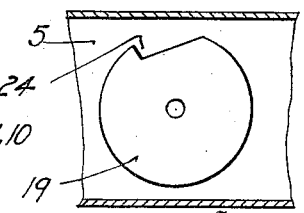
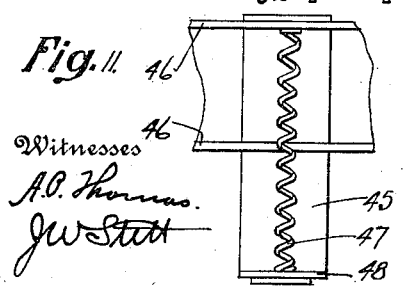
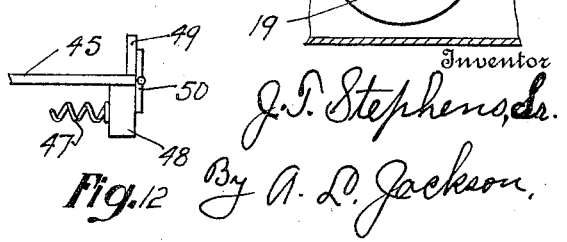
Witnesses
A. C. Thomas.
J. W. Stitt
Inventor
J. T. Stephens, Sr.
By A. L. Jackson.
Attorney J. T. STEPHENS, Sr.
AUTOMATIC CUTTING AND TYING DEVICE FOR BALING PRESSES.
APPLICATION FILED FEB. 24, 1912.
1,046,891.
Patented Dec. 10, 1912.
2 SHEETS—SHEET 2.
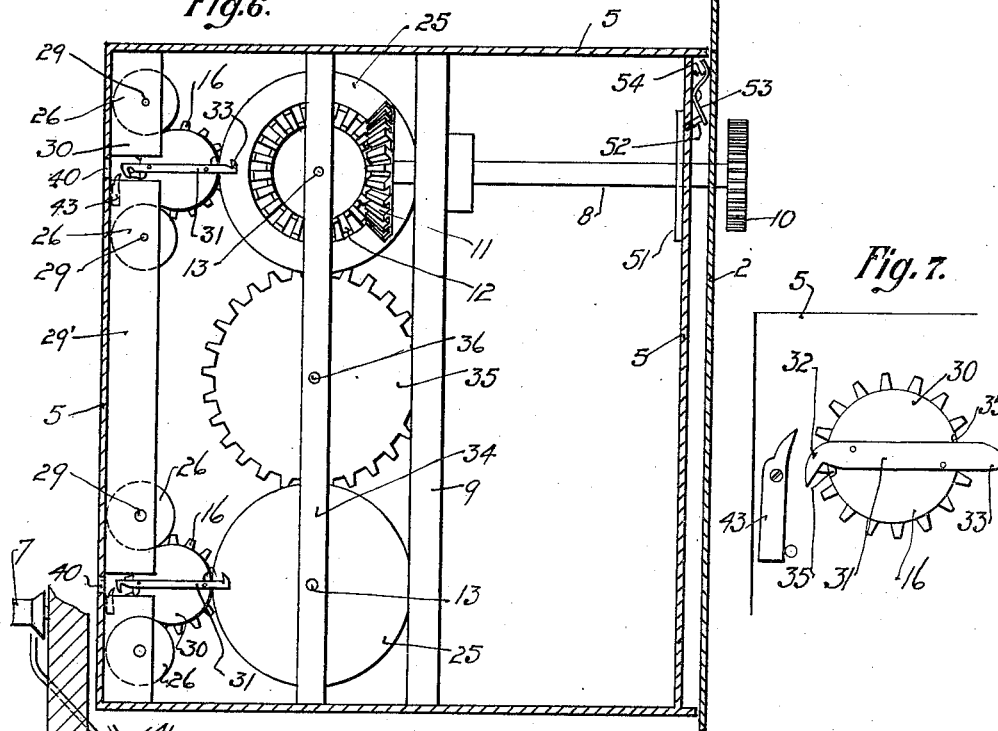
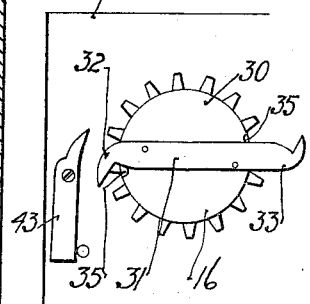
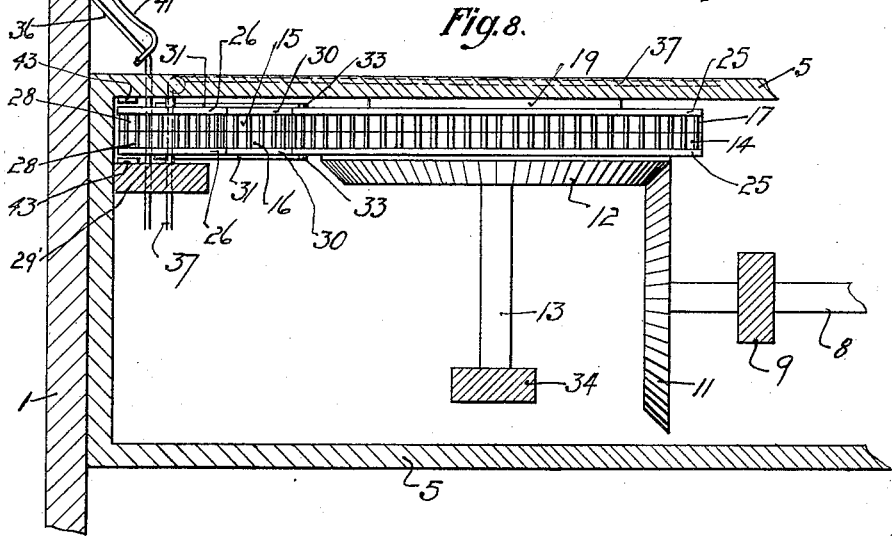

UNITED STATES PATENT OFFICE.

JESSE T. STEPHENS, SR., OF DUNCAN, OKLAHOMA, ASSIGNOR OF ONE-THIRD TO C. W. HAGAN, OF DUNCAN, OKLAHOMA.

AUTOMATIC CUTTING AND TYING DEVICE FOR BALING-PRESSES.

1,046,891.   Specification of Letters Patent.   Patented Dec. 10, 1912.

Application filed February 24, 1912.   Serial No. 679,717.

*To all whom it may concern:*

Be it known that I, JESSE T. STEPHENS, Sr., a citizen of the United States, residing at Duncan, in the county of Stephens and State of Oklahoma, have invented certain new and useful Improvements in Automatic Cutting and Tying Devices for Baling-Presses, of which the following is a specification.

My invention relates to automatic tying devices for baling presses and the object is to provide tying devices which will tie one or more wires or other binding material on a bale of hay, straw, or other fibrous material, which devices will be automatically operated just about the time a bale is completed, that is, just about the time the pressing is completed and before the pressing devices stop moving.

The advantages are that the bale is bound securely and bound without loss of time, the tying being accomplished while material is being fed into the press for a new bale, and the power for accomplishing the tying is derived from the movement of the presser block while forcing the material through the baling box, the tying is accomplished with accuracy and certainty.

Other objects and advantages will be fully explained in the following description and the invention will be more particularly pointed out in the claims.

Reference is had to the accompanying drawings which form a part of this application.

Figure 1 is a horizontal section of a baling box, showing the position of a bale of hay completed and a tie box in position for tying the wires at the rear corner of the bale and hay being fed in behind a tie box, and showing the position of a slide for receiving a tie box prior to inserting the tie box in the baling box. Fig. 2 is a horizontal section of a baling box, showing an incomplete bale, enough hay having been pressed beyond the retaining dogs, the plunger drawn back for a new charge, the tie box just inserted in the baling box, and the position of the tie wires just before the tie box begins to move in the baling box toward the incomplete bale. Fig. 3 is a side elevation of a baling press, showing a box in position to be shoved into the baling box and showing the gear wheels for accomplishing the tying. Fig. 4 is an interior side elevation of a side of the baling box, showing the springs which aid in positioning the tie wires. Fig. 5 is a detail view, showing the manner of tying and cutting the wires after being tied. Fig. 6 is an interior elevation of the tie box, showing the gearing for accomplishing the tying. Fig. 7 is a detail view of the tying and cutting wheels and the coöperating hooks. Fig. 8 is a plan view of the tying and cutting wheels, the coöperating hooks, the gearing for driving the cutting and tying wheels, and showing the positions of the binding wires. Figs. 9 and 10 are detail views of the mechanism for permitting the reversal of one of the tying wheels and for preventing the turning of the other wheel at the same time. Figs. 11 and 12 are detail views of the means for inserting the tie box.

Similar characters of reference are used to indicate the same parts throughout the several views.

Only enough of a baling press is shown to illustrate the invention. A baling box of ordinary construction is shown with sides 1 and 2 and a plunger 3 of the usual construction is shown in conventional form. The box has an opening 4 through the side 2 for inserting a tie box 5. The tie box 5 carries practically all the mechanism for accomplishing the tying and the tie box takes the place of the ordinary division boards or blocks which are used in such presses. The baling box has the usual dogs 6 which hold the tie box in the same way as the dogs usually hold the ordinary division blocks. Four strands of binding wire are used in binding a bale and four spools 7 are mounted in suitable bearings on the sides of the box to furnish the wire and these spools can be made to receive the coils of wire which are on the market.

The tie box is a rectangular box 5 and the principal tying mechanism is mounted in this box. A shaft 8 is journaled in the side of box 5 and in a bearing bar 9 and this shaft is driven by a cog wheel 10. This shaft drives a bevel gear wheel 11 and wheel 11 drives a bevel gear wheel 12 which is rigid with and drives shaft 13. A pair of cog wheels 14 and 17 are mounted on the shaft 13. The wheels 14 and 17 drive two tying and cutting wheels 15 and 16. The wheel 14 is rigid with cog wheel 12 and is driven by this wheel. The wheel 14 has a pin 18 which is rigid therewith and projects from the face thereof into a slot 21 in the wheel 17 by which the wheel 17 is normally driven with the wheel 14. Provision is made for reversing the wheel 14 as hereinafter set forth. Provision is made for preventing the reversal of the wheel 17 when wheel 14 is reversed. A disk 19 is rigid with the side of the box 5 and has a notch 24 therein. A spring dog 22 is pivoted on the side of wheel 17 and a spring 23 will cause the dog 22 to fall in the notch 24. The reversal of wheel 14 is only temporary and the slot 21 is made just long enough to permit the required reversal of wheel 14, consequently the wheel 17 can be reversed until the pin 18 moves the length of the slot 21. Ordinarily the dog 22 will ride over the notch 24 in disk 19 without affecting the movement of the wheels 14 and 17. The wheels 14 and 17 have disks or flanges 25 rigid therewith which project as far radially as the points of the teeth of the cog wheels for bearing purposes as will appear in the following description. The wheels 15 and 16 have no shaft but are held in place by the disks 25 and similar disks 26 on idle cog wheels 28 which mesh with wheels 15 and 16. The wheels 28 are provided with shafts 29 which are journaled in the side of the box 5 and in a bearing 29'. There are two pairs of the cog wheels 28, located as shown by the shafts 29 and disks 26 in Fig. 6. The wheels 15 and 16 have disks or annular shoulders 30 which bear on the disks 25 at one point and bear against two other pairs of disks 26 at two other points so that the wheels 15 and 16 are in fact provided with roller bearings and are thus held in place without a shaft. The wheels 15 and 16 bear against each other closely so that the binding wires will be clipped by the teeth of the wheels when reversed as hereinafter described. Bars 31 are attached to the outer sides of disks 30 and provided with hooks 32 and 33 on the ends for the purpose of engaging the binding wires, as hereinafter described.

The binding wires are placed on two parts of the bale and this makes it necessary to duplicate the tying mechanism. The tying mechanism has been described and shown for tying the binding wires around the upper part of the bale. Fig. 6 shows the duplicate mechanism. The bearing bar 34 for shaft 13 extends to the bottom of the box and a shaft 13 is journaled in the lower part of the bar 34 for driving cog wheels corresponding to wheels 14 and 17. Cog wheels 35 are provided with a shaft 36 journaled in box 5 and bar 34 and these cog wheels mesh with the cog wheels 14 and 17 above with similar wheels below for driving the wheels below. In all other respects the tying mechanism in the lower part of the box is the exact duplicate of the gearing in the upper part already described, the gearing in the lower part being driven by the gearing in the upper part. The disks 30 are cut out slightly at 35 so that the binding wires can lie at the bottom of the spaces between the teeth of the wheels 15 and 16.

The binding wires are fed from spools to the bales as the bales are being formed. Two wires are fed on each side of the baling box and fed from two spools on each side of the baling press. The wires 36 from one side of the baling box bind only one side of the bale and the wires 37 from the other side of the baling box bind the other side and the two ends of the bale.

In Fig. 1, 38 indicates a complete bale and 39 indicates an incomplete bale. The tie box 5 is shown in Fig. 1 between the completed bale and the incomplete bale and just at the position when the tie is made and the wires cut. A knot is formed in the wires for bale 38 and a knot is formed simultaneously in the wires for the incomplete bale 39, the wires being cut between the two knots by the wheels 15 and 16 by a reverse motion of wheel 16. The positions of the wire 37 are shown by dotted outlines in Fig. 1 just at the time the wires are cut. In Fig. 2 a bale is shown complete, ready to be bound on the back corner. It must be understood the wires are tied on the forward corner before the bale is complete. In Fig. 2 the positions of the wire 37 are shown just as the tie box is inserted through the side of the bale box into the bale box. The tie box has a slot 40 at the entering side to receive the wires. When the tie box is shoved in the bale box, it changes the position of the wire 37, as shown in Fig. 1, to the position shown in Fig. 2. The hay being fed in behind the tie box, will gradually force the tie box again to the position shown in Fig 1. The wires 36 from spools 7 are fed to the tie box through springs 41. The wire 37 lies in position to be caught by the short hook 32 and the wire 36 lies in position to be caught by the longer hook 33. The tying and cutting are done automatically. As the tie box is being forced along by the hay, all the gear wheels in the tie box are idle until the wheel 10 reaches the rack 42 on the outside of the baling box. Just as the tie box 5 is forced past the springs 41 and the dogs 6, the springs 41 rebound and force the wires 36 over the swinging dogs 43 to the position shown in Fig. 8, and at the same time the wheel 10 engages the rack 42. This forces all the gearing in the tie box to operating and the hooks 32 and 33 force the wires 36 and 37 into the cogs on wheels 15 and 16. The wheels 15 and 16 commence turning and twist the wires 36 and 37, as shown in Fig. 5 and thus form knots in the wires. The rack 42 is just long enough to make the wheels 15 and 16 turn five times (they could be made to turn more if necessary). When the wheels have turned five times, the wheel 10 leaves the rack 42 and immediately engages the rack 44. This will reverse wheel 14 and consequently reverse wheel 16. This will cause the wires to be clipped by the scissors-like action of the teeth of the wheel 16 against the teeth of wheel 15. The operation of rack 44 is only momentary, just long enough to cause a cutting of the wires. The wheel 15 is prevented from being reversed by the mechanism shown in Figs. 9 and 10. As soon as the wires are cut, the bale in front of the tie box may be removed from the bale box. The wires may be twisted more or less to form the knots. The dogs 43 will swing one way to let the wires 36 pass over and when the wires are once over the dogs, the dogs will prevent the wires from rebounding back out of reach of the hooks 33.

The tie box 5 is placed in the baling box by means of a slide 45 which is mounted on cleats 46 attached to the bottom of the baling chamber and support the slide on a level with the bottom of the baling chamber. A spiral spring 47 is attached to one cross cleat 46 and to a cleat 48 on the front edge of the slide for forcing the tie box with the slide so that the tie box will be forced in place in the baling chamber. The slide is provided with a keeper 49 which is attached to the front edge of the slide to prevent the tie box from falling from the slide and so that the tie box will be held straight while being forced into the baling chamber and this keeper is attached to the slide by a spring hinge 50 so that the keeper can be swung down so that the box can be placed on the slide.

It is necessary to lock the gearing in the tie box against movement while being changed from the discharge end of the baling chamber to the slide 45. A disk 51 is fixed on shaft 8 and provided with a suitable number of holes to receive a locking pin 52 which is carried by a spring dog 53. When the tie box is placed in the baling chamber, the dog 53 will be pressed inwardly at the handle end, compressing the spring 54 and drawing the pin 52 out of the disk 51. As soon as the tie box 5 passes out of the baling chamber the dog 53 will be released by the baling chamber and the pin 52 will automatically lock the disk 51 and thus lock the entire gearing in the tie box against movement.

The cog teeth on wheels 28 may be dispensed with as the drums with flanges 26 would hold the wheels 15 and 16 without the teeth. The tie box has slots 55 in the side for receiving the wires 37 so that the wires will not be displaced or disarranged by the hay or other material as it is pressed into the baling chamber.

Various changes may be made in the construction and arrangement of the several parts without departing from my invention.

What I claim, is,—

1. A bale binding mechanism comprising a baling box having an opening for receiving a tie box, a tie box adapted to be inserted in said baling box, tying and cutting mechanism in said tie box, gearing in said tie box for operating said tying and cutting mechanism, and gearing on said baling box for operating the gearing in said tie box.

2. A bale binding mechanism comprising a baling box having an opening for receiving a tie box, a tie box adapted to be inserted and moved in said baling box, tying and cutting mechanism carried by said tie box, means for feeding binding wire to said tie box, gearing carried by said tie box for operating the tying and cutting mechanism, and gearing on said baling box adapted to drive and reverse the gearing carried by said tie box.

3. A bale binding mechanism comprising a baling box having a lateral opening therein and a slot leading from said opening, a tie box movable in said baling box, tying and cutting mechanism in said tie box adapted to tie knots in wires at one end of a completed bale and knots at one end of an incomplete bale simultaneously, means for feeding wire to said tying mechanism, gearing carried by said tie box for operating said tying and cutting mechanism including a shaft projecting through said slot and a gear wheel on said shaft, and racks on said baling box for operating and reversing said gearing carried by said tie box.

4. A bale binding mechanism having a baling box, a tie box movable in said baling box, a pair of cog wheels in said tie box for twisting knots in wires in front of said tie box and in the rear thereof and cutting the wires between the knots, means for feeding wires to said tie box, and means for driving and reversing said cog wheels.

5. A bale binding mechanism having a baling box, a tie box movable in said baling box, a pair of cog wheels in said tie box for twisting knots in wires in front of said tie box and in the rear thereof and for cutting the wires between the knots, roller bearings for holding said cog wheels in place, means for feeding wires to said tie box, and means for driving and reversing said cog wheels.

6. A bale binding mechanism having a baling box, a tie box movable in said baling box, a pair of cog wheels and hooks carried thereby and coöperating therewith for twisting knots in wires in front of the tie box and in the rear thereof and for cutting the wires between the knots, means for feeding wires to said tie box, and means for driving and reversing said cog wheels.

7. A bale binding mechanism having a baling box, a tie box movable in said baling box, a pair of cog wheels and hooks carried thereby and coöperating therewith for twisting knots in wires in front of the tie box and in the rear of the tie box and for cutting the wires between the knots, means for feeding wires to said tie box, roller bearings for holding said cog wheels in place, means for driving said cog wheels, and means for reversing one of said cog wheels.

8. A bale binding mechanism having a baling box, a tie box movable in said baling box and forming the division block between bales, tying and cutting mechanism carried by said tie box for forming knots in the wires on the bale in front and on the bale in the rear of the tie box and cutting the wires between the knots, means for feeding wires to said tying mechanism, and means for operating said tying and cutting mechanism while said tie box is moving in said baling box.

9. A bale binding mechanism having a baling box, a tie box movable in said baling box, means for inserting said tie box in said baling box, said tie box being automatically moved in said baling box by the material being formed into bales, wire tying and cutting mechanism carried by said tie box, means for feeding wire to said tie box, and means for operating said tying and cutting mechanism while said tie box is being moved in said baling box.

10. A bale binding mechanism having a baling box, a tie box movable in said baling box, a pair of cog wheels in said tie box and hooks carried thereby and coöperating therewith for twisting knots in wires in front of the tie box and in the rear thereof and for cutting the wires between the knots, guards coöperating with said hooks, means for feeding wires to said tie box, and means for driving said cog wheels.

In testimony whereof, I set my hand in the presence of two witnesses, this 20th day of February, 1912.

JESSE T. STEPHENS, Sr.

Witnesses:
A. L. JACKSON,
J. W. STETT.

Copies of this patent may be obtained for five cents each, by addressing the "Commissioner of Patents, Washington, D. C."